(12) United States Patent
Pombo

(10) Patent No.: US 10,165,850 B1
(45) Date of Patent: Jan. 1, 2019

(54) RELEASABLY-ENGAGEABLE STRAP LOOP

(71) Applicant: RealWear, Incorporated, Milpitas, CA (US)

(72) Inventor: Stephen A. Pombo, Campbell, CA (US)

(73) Assignee: REALWEAR, INCORPORATED, Vancouver, WA (US)

( * ) Notice: Subject to any disclaimer, the term of this patent is extended or adjusted under 35 U.S.C. 154(b) by 0 days.

(21) Appl. No.: 15/858,827

(22) Filed: Dec. 29, 2017

(51) Int. Cl.
*A44B 13/00* (2006.01)
*A45F 5/00* (2006.01)
*G06F 1/16* (2006.01)

(52) U.S. Cl.
CPC ............... *A45F 5/00* (2013.01); *A44B 13/00* (2013.01); *A45F 2005/006* (2013.01); *G06F 1/163* (2013.01); *Y10T 24/45414* (2015.01)

(58) Field of Classification Search
CPC ............ F16B 45/02; Y10T 24/45414; Y10T 24/45419; Y10T 24/3485; Y10T 24/3493
USPC ........ 24/600.6, 601.1, 601.2, 599.9; 224/181
See application file for complete search history.

(56) References Cited

U.S. PATENT DOCUMENTS

| | | | | |
|---|---|---|---|---|
| 4,061,873 A * | 12/1977 | Berg, Jr. | ............... | H01B 17/145 174/158 F |
| 4,464,813 A * | 8/1984 | Bakker | ................... | A44B 11/28 24/601.1 |
| 5,005,266 A | 4/1991 | Fister et al. | | |
| 5,469,607 A * | 11/1995 | Henningsson | ............ | A01G 9/22 24/716 |
| 5,517,735 A * | 5/1996 | Tsai | ........................ | F16B 45/02 24/599.9 |
| 6,000,108 A * | 12/1999 | Roan | ......................... | B66C 1/36 24/265 H |
| 6,216,322 B1 * | 4/2001 | Kuo | ...................... | A45C 7/0045 190/102 |
| 8,060,994 B2 * | 11/2011 | Petzl | ....................... | F16B 45/02 24/599.9 |
| 2011/0138586 A1 | 6/2011 | Gompert et al. | | |
| 2016/0174695 A1 * | 6/2016 | Keune | ..................... | H04M 1/05 224/181 |

* cited by examiner

*Primary Examiner* — Justin Larson
(74) *Attorney, Agent, or Firm* — Shook, Hardy & Bacon L.L.P.

(57) ABSTRACT

A releasably-engageable strap loop having a unitary body is configured to enhance the securement of a strap or other material within a limited range of motion. The strap loop can be employed to secure, among other things, a head-mounted display unit to a wearable article worn by an individual, facilitating restricted movement of the head-mounted display unit relative to the individual's preferred field of view or any other part of the individual while the individual is active. The releasably-engageable strap loop can include, among other things, a unitary body that can receive a strap, such as one employable to secure a head-mounted display unit to a wearable article or safety gear worn by an individual. In some embodiments, the releasably-engageable strap loop can also include a securing member that is releasably or permanently securable to an external body, providing additional securement and restriction of movement of the head-mounted display unit relative to the individual.

20 Claims, 7 Drawing Sheets

RELEASABLY-ENGAGEABLE STRAP LOOP

BACKGROUND

Head-mounted display units allow a user to mount mobile computing devices on or around their head, enabling the user to transport and utilize advanced technologies with greater ease and flexibility. Head-mounted display units also enable a user to have interaction with the technology while otherwise remaining engaged in other tasks. For instance, head-mounted display units can be voice activated and hands-free, so that users are able to focus on other tasks, which is beneficial, particularly for users who may work in the field, perform physical tasks, or simply desire a more hands-free computing experience. As such, securement and restriction of movement of the head-mounted display unit when worn is key to safety and usefulness. Therefore, a device that will aid in safely securing the head-mounted display unit to a user or an object worn by the user, providing stronger securement and restricting movement so that the unit will remain in place during physical activity would be beneficial.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

While head-mounted display units provide great utility for various use cases, securement of a head-mounted display unit relative to the user can be a difficult task. In situations where user movement is significant, an improved hands-free experience would minimize a user's need to readjust the head-mounted display unit. Industries such as electrical, construction, mining, and the like, have requirements that users wear head protection when on the field. Head protection, such as helmets or bump caps, provide a solid surface for mounting a head-mounted display unit. At a high level, embodiments of the present invention are generally directed to a releasably-engageable strap loop that comprises a unitary body that receives a strap, such as a strap of a tri-band strap that is employed to secure a head-mounted display unit ("HMDU") to an article worn by a user. An article worn by the user can include, among other things, a helmet, a bump cap, spectacles, goggles, ear muffs, belts, or any other safety gear or article that can be worn by the user. In this regard, it is contemplated that the HMDU is not necessarily limited to a head-mounted display, but a mobile computing device that can generally be worn on the body of the user. The HMDU can be secured to the tri-band strap, and the tri-band strap can be secured to the wearable article, so that the HMDU can be secured in a position relative to the user.

In accordance with some embodiments, the unitary body of the strap loop comprises a gate member and a hooked-frame member, the gate member having a first elbow end that joins a second elbow end of the hooked-frame member at an elbow member of the strap loop. The gate member further includes a gate member body having a first engaging end opposite the first elbow end, wherein the first engaging end has an outwardly-facing flange and at least one notched portion that together present a set of leg members and a corresponding set of outwardly-facing feet members. The hooked-frame member further includes a hooked-frame member body having a second engaging end that extends from a bended portion of the hooked-frame member opposite the second elbow end. The second engaging end has at least one inwardly-facing flange and the bended portion has at least one inwardly-facing saddle member. The inwardly-facing saddle member is configured to complement the set of leg members and the inwardly facing flange is configured to complement the corresponding set of outwardly-facing feet members when the strap loop is in an engaged state.

In a disengaged state, the strap loop can receive a strap, such as a strap of a tri-band strap described herein. In essence, the strap loop in the disengaged state provides an open loop that enables a strap to be inserted into an inside face of the strap loop. In various embodiments, the unitary body can comprise a rigidly-flexible material, where the strap loop is generally urged to remain in the disengaged state. To engage the strap loop, the hooked-frame member body and the elbow portion, each comprised of the rigidly-flexible material, can be bent with an applied force such that the inwardly-facing saddle member receives the set of leg members, and the inwardly facing flange receives the corresponding set of outwardly-facing feet members. As the applied force is released, the rigidly-flexible material is urged to return to its manufactured state, securing the strap loop into the engaged state. In a preferred embodiment, the strap loop can receive a strap, such as a strap of the tri-band strap, to secure the strap therein.

In some further embodiments, the releasably-engageable strap loop can also comprise a securing member. The securing member is disposed opposite the inwardly-facing saddle member of the bended portion and is operable to secure the releasably-engageable strap loop to an external body (e.g., a wearable article). In some embodiments, the strap loop securing member includes a clip portion that is configured to secure the releasably-engageable strap loop to a cap brim of a bump cap. In other embodiments, the securing member can include a fastener (e.g., bolt, nut, clip, button, strap, adhesive) or other member operable to secure the strap loop to the external body.

Aspects herein are further directed to a method of manufacturing a releasably-engageable strap loop. The method comprises obtaining a mould that forms a cavity that is shaped in accordance with the releasably-engageable strap loop disclosed herein. An injection moulding device can be employed to inject, among other things, a rigidly-flexible material that is heated to at least a melting point and subsequently injected into the mould. The cavity of the mould, once filled by the heated rigidly-flexible material, is left to cool and harden to the configuration (e.g., shape) of the cavity. The mould can then be separated from the hardened material, thereby providing a releasably-engageable strap loop having a shape that is based on the obtained mould. In further embodiments, the releasably-engageable strap loop (and the configuration of the cavity) can also include a securing member in accordance with further embodiments described herein.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

Examples of the present invention are described in detail below with reference to the attached drawing figures, wherein.

DETAILED DESCRIPTION

Figure 1:
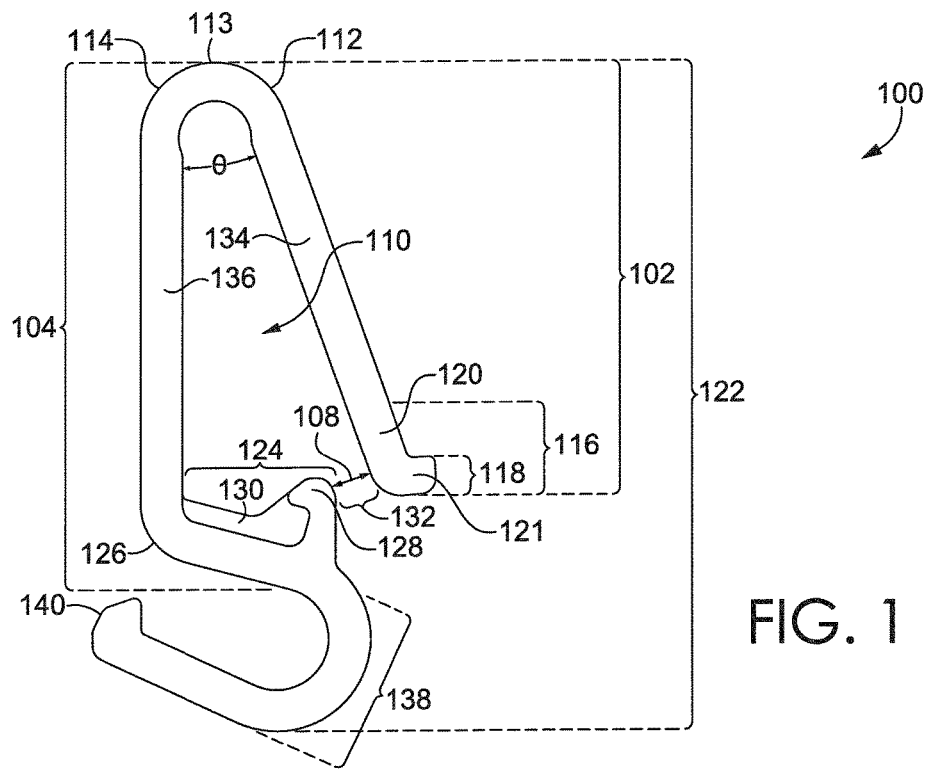
FIG. 1 depicts a top-down view of a releasably-engageable strap loop in the disengaged state, in accordance with aspects herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Head-mounted display units (HMDUs) have been developed to promote the ability to work in different environments in a hands-free fashion. The ability to easily and safely utilize head-mounted display units in the field while taking part in various physical activity is important for individuals that need to utilize HMDUs to perform their work. For example, a construction engineer who is on site typically needs to carry materials, such as blueprints, manuals, communication devices, or other items, while conducting physical work. These items can be cumbersome, decrease efficiency, and increase the risk of accidents on site. The use of HMDUs in the field can help decrease such risk. Now, individuals can mount HMDUs to wearable articles, such as protective wear (e.g., a helmet or a bump cap), enabling workers to have instant access to electronic copies of documents (e.g., blueprints and manuals), communicate with others, or even communicate with the device provided that the device is voice-operable. This can enable an individual to work more safely and efficiently in the field. While HMDUs units have provided various benefits to individuals utilizing them for their jobs, the obstacles of strong securement and restriction of movement of the HMDU remains.

Therefore, there is a need for a mechanism to provide stronger securement of the HMDU to a wearable article for improved restriction of movement while in use. Strong securement of the HMDU will enable a worker to remain hands-free, giving them the ability to take on other tasks in the field that requires use of their hands. Additionally, limiting the movement of the HMDU, while secured to the wearable article, increases the safety and effectiveness of the unit by enabling the individual utilizing the HMDU to more freely move about and utilize the HMDU while working in the field, making it more user-friendly and practical for use.

Embodiments of the present technology address the challenge of utilizing a HMDU while restricting its movement and providing strong securement for maximized utility and safety of the HMDU. The present invention provides better securement and restriction of movement of HMDUs when worn by providing a releasably-engageable strap loop that can receive a strap (e.g., a first strap of a tri-band strap) when the strap loop is in a disengaged state, and secures the strap within a continuously enclosed portion when the strap loop is in an engage state. When the releasably-engageable strap loop is in the engaged state, the tri-band strap loop remains secured in the continuously enclosed portion.

Further, the releasably-engageable strap loop may also include a securing member that either permanently or removably secures the strap loop to a wearable article (e.g., protective wear). Thus, when the strap is secured within the strap loop, the strap can be fixed in a position relative to the wearable article. The HMDU, having the strap fixed thereto, can therefore also be fixed in a position relative to the wearable article. In this regard, the HMDU can be fixed in a position relative to the user wearing the wearable article.

This increases the securement of the HMDU and further restricts movement of the HMDU, allowing the worker to perform tasks hands-free while having access to the information and tools needed for the job at hand. While the securing member of the present embodiment includes a clip portion, it is contemplated that various other configurations of securing members may be combined with the releasably-engageable strap loop in order to provide stronger securement and restriction of movement of HMDUs and other devices.

Generally, embodiments of the present invention are directed to a releasably-engageable strap loop that is adapted to secure a strap that is coupled to the HMDU. The strap loop, securing the strap, can be permanently or removably secured to a wearable article, thereby securing the HMDU in a position that is fixed relative to the wearable article. Provided that the wearable article is fixed to the user, the HMDU can also be fixed in a position relative to the user.

Figure 2:
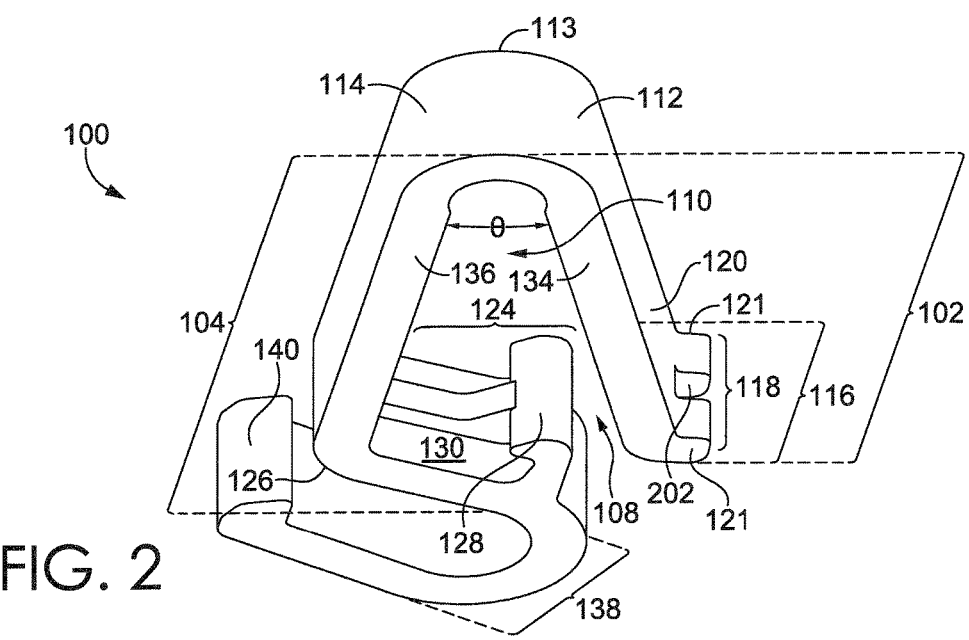
FIG. 2 depicts a perspective view of a releasably-engageable strap loop in the disengaged state, in accordance with aspects herein.

Turning initially to FIGS. 1 and 2, which illustrate a top-down and perspective view of the releasably-engageable strap loop 100 in the disengaged state 132, the releasably-engageable strap loop 100 comprises a single, continuous unitary body 122 that is generally configured in a non-linear shape. The unitary body 122 further comprises a gate member 102 and a hooked-frame member 104. The gate member 102 is non-stationary and can be pushed inward, while the hooked-frame member 104 can be pushed outward, with an applied force, to coerce the strap loop 100 into the engaged state 302 depicted in FIGS. 3-4.

In the disengaged state 132, the gate member's 102 position creates an opening 108. The opening 108 is an opening that can be wide enough to receive a strap into space 110 for securement within the releasably-engageable strap loop 100. Further, the opening 108 may change and become narrower based on the amount of pressure applied to the gate member 102. The opening 108 can present a maximum space 110 at which the gate member 102 can be pivoted outward without bending or breaking from the unitary body 122.

Figure 3:
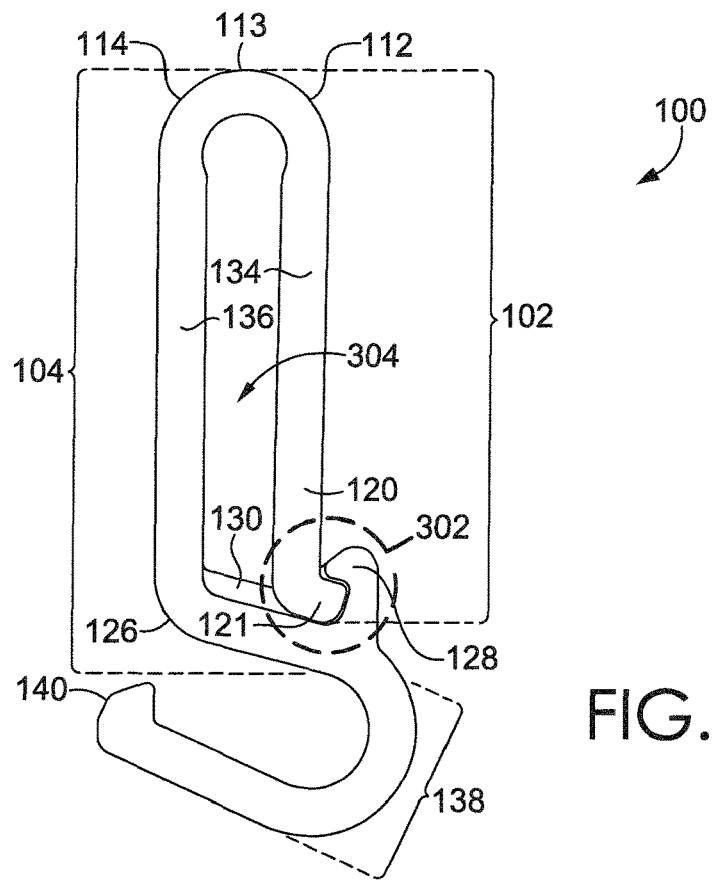
FIG. 3 depicts a top-down view of a releasably-engageable strap loop in the engaged state, in accordance with aspects herein.
Figure 4:
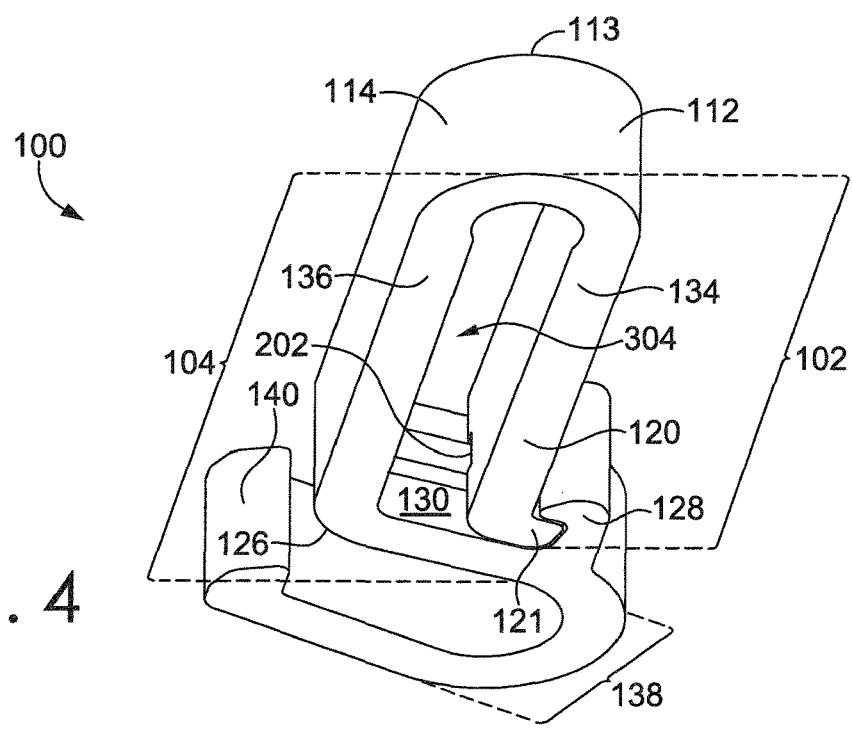
FIG. 4 depicts a perspective view of a releasably-engageable strap loop in the engaged state, in accordance with aspects herein.

The gate member 102 further comprises a first body portion 134 and the hooked-frame member comprises a second body portion 136. In the disengaged state 132, the gate member 102 is pivoted in a direction opposite a second portion 136 of the hooked-frame member 104. Further, the first body portion 134 and the second body portion 136 are configured to present an acute angle Θ when the releasably-engageable strap loop 100 is in the disengaged state 132 as seen in FIGS. 1 and 2. When the releasably-engageable strap loop 100 is in the engaged state 122, the first body portion 134 of the gate member 102 is substantially parallel to the second body portion 136 of the hooked-frame member 104 as seen in FIGS. 3 and 4.

Additionally, the gate member 102 includes a first elbow end 112, and the hook-frame member 104 includes a second elbow end 114, which together form an elbow member 113 of the strap loop 100. The gate member 102 further includes a first engaging end 116 opposite the first elbow end 112. The first engaging end 116 has an outwardly-facing flange 118 and a least one notched portion 202. The notched portion 202 and outwardly-facing flange 118 together present a set of leg members 120 and a corresponding set of outwardly-facing feet members 121.

The hooked-frame member 104 further comprises a second engaging end 124 that extends from a bended portion 126 of the hooked-frame member 104 opposite the second elbow end 114. The second engaging end 124 has at least one inwardly-facing flange 128 and the bended portion 126 has at least one inwardly-facing saddle member 130. The inwardly-facing saddle member 130 is configured to releasably couple with the set of leg members 120 and the inwardly-facing flange 128 is configured to releasably couple with the outwardly-facing feet members 121 when the releasably-engageable strap loop 100 is in the engaged state as seen in FIGS. 3-4.

The unitary body 122 is constructed with a rigidly-flexible material, such as polymer, polyethylene, polypropylene, or any other strong, yet flexible material, including a blend of any one or more of the foregoing. It is important for the material used to construct the unitary body to be both rigid and flexible in order to be utilized as intended. The material must be rigid enough to retain its shape and provide for securement, while also being flexible so that the gate member 102 can be pivoted from the engaged state 302 (shown in FIGS. 3-4) to the disengaged state 132 and vice versa. In other embodiments, the rigidly-flexible material may include nylon or another rigidly-flexible plastic composition. Additionally, any and all materials which may be rigidly-flexible and can be constructed into a unitary body as seen in FIG. 1 are contemplated herein. In accordance with embodiments described herein, a unitary body is defined as having a single and continuous body, devoid of separate parts that are fixed or secured together in any way. In other words, the unitary body described herein is manufactured such that each of the described elements are extensions of one another, either directly or indirectly.

FIG. 2's perspective view of the disengaged state 132 shows a more detailed image of the components of the first engaging end 116 of the gate member 102 and the second engaging end 124 of the hooked-frame member 104. In FIG. 2, the at least one notch portion 202 can be shown. The notched portion 202 of the first engaging end 116 is keyed during construction to have a width and height that correspond with the inwardly-facing saddle member 130 such that when the releasably-engageable strap loop 100 goes from the disengaged state 132 to the engaged state 302 (shown in FIGS. 3-4), the notched portion couples with the inwardly-facing saddle portion 130 and inwardly-facing flange 128.

Turning next to FIGS. 3-4, which illustrate the releasably-engageable strap loop 100 of FIGS. 1-2 in the engaged state 302. In the engaged state 302, the inwardly-facing saddle member 130 is configured to complement and releasably secure the set of leg members 120, and the inwardly-facing flange 128 is configured to complement and releasably secure the set of outwardly-facing feet members 121. As seen in FIGS. 3-4, the notched portion 202 and the outwardly-facing feet members 121 are keyed to essentially "fit" into the inwardly-facing saddle member 130 and the inwardly-facing flange 128. The releasable coupling that occurs in the engaged state 302 prevents the outwardly-facing leg members 122 from disengaging from the inwardly-facing flange 128, which could result in the release of the material being secured within the strap loop 100 and the gate member 102 moving from the engaged state 302 to the disengaged state 132. Disengaging will only occur when pressure is applied to the gate member 102 to uncouple the inwardly-facing saddle member 130 from the set of leg members 120 and the inwardly-facing flange 128 from the set of outwardly-facing feet members 121.

Figure 5:
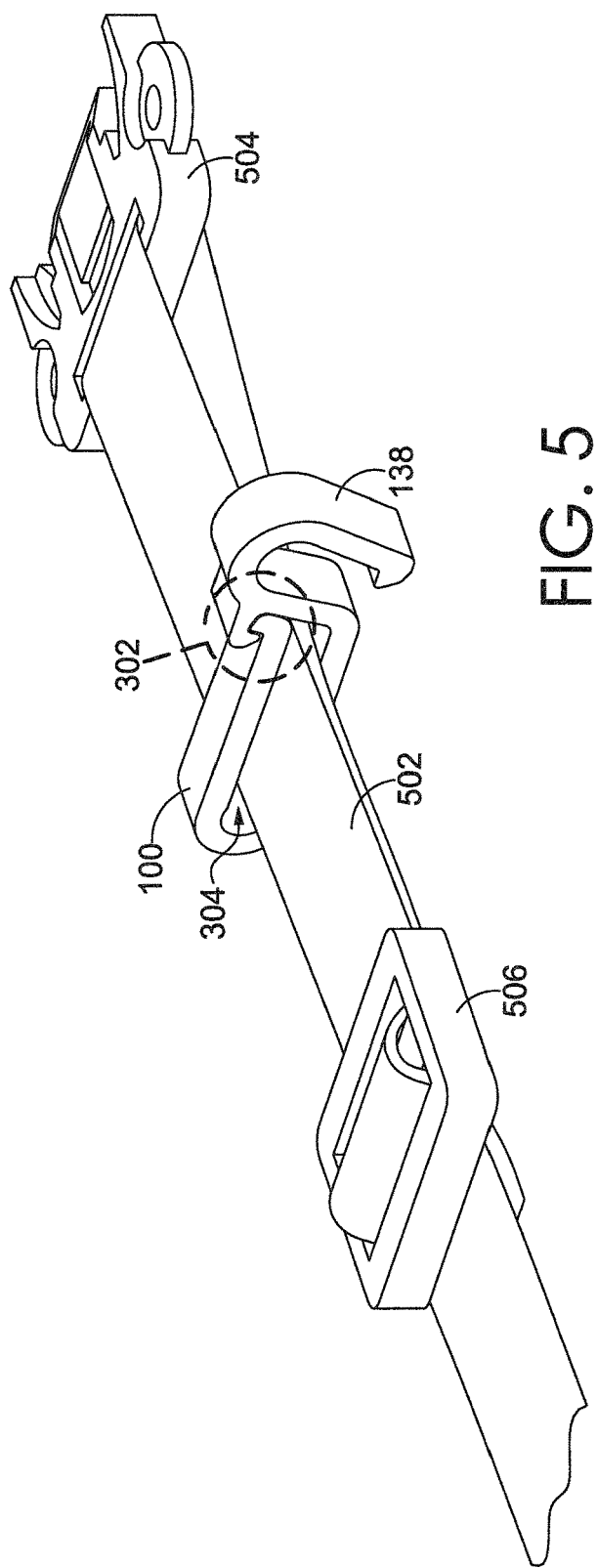
FIG. 5 depicts the releasably-engageable strap loop in the engaged state where the releasably-engageable strap loop has received a first strap of a tri-band strap, in accordance with aspects herein.

FIGS. 3-4 illustrate an engaged state of the strap loop after inward-facing pressure has been applied to the gate member 102, and outward-facing pressure has been applied to second body portion 136 of the hooked-frame member 104, which urged the gate member 102 into the inner region 304 resulting in the engaged state 302 upon release of the pressure. In this regard, a continuously enclosed inner region 304 is formed. This continuously enclosed inner region 304 creates a space where material, such as a strap 502 from a tri-band strap 600, is inserted into the opening 108 of FIGS. 1-2. Once in the engaged state 302, the material inserted is secured into the continuously enclosed inner region 304. As depicted in FIG. 5, the releasably-engageable strap loop 100 receives strap 502, such that the strap 502 is secured within the continuously enclosed inner region 304. The strap 502 will remain secured within the continuously enclosed inner region 304 until inward-facing pressure is applied to the gate member 102, and outward-facing pressure is applied to the second body portion 136 of the hooked-frame member 104 to disengage or decouple the inwardly-facing saddle member 130 from the set of leg members 120 and the inwardly-facing flange 128 from the outwardly-facing feet members 121, placing the strap loop into the disengaged state.

FIG. 4 further illustrates a perspective view of the engaged state 302 in which the releasable coupling of the inwardly-facing saddle member 130 to the set of leg members 120 and the inwardly-facing flange 128 to the outwardly-facing feet members 121 is shown more clearly. In FIG. 4, the engagement of the notched portion 202 to fit into the inwardly-facing saddle 130 can be seen. Further, the precise coupling of the outwardly-facing feet members 121 to the inwardly-facing flange 128 can also be seen.

As seen in FIGS. 1-4, the unitary body 122 can also comprise a strap loop securing member 138. The strap loop securing member 138 is located opposite the inwardly-facing saddle member 130 of the hook-frame member 104.

The strap loop securing member 138 is configured to secure the releasably-engageable strap loop 100 to an external body. In the illustrated embodiment of FIGS. 1-4, the strap loop securing member 138 is configured in a curved, non-linear shape (e.g., a clip), such that the unitary body presents a serpentine shape.

In some embodiments, the strap loop securing member 138 may include a clip portion 140 as seen in FIGS. 1-4. This clip portion 140 is configured to secure the releasably-engageable strap loop 100 to an external body, such as a cap brim (e.g., cap brim 804 on bump cap 804 of FIG. 8). In some embodiments, the engagement of the clip portion 140 to a cap brim 804 prevents a strap secured within the enclosed region 304 in the engaged state 302 from moving. It is contemplated that any number of straps can be employed, each securing one of a set of straps (e.g., one of three straps in a tri-band strap) thereby securing the HMDU to the bump cap 802 and restricting movement of the HMDU relative to the bump cap 802. While FIGS. 1-4 depict the strap loop securing member 138 with a clip portion 140, the securing member 138 may be configured in any variety of shapes to secure onto a variety of objects. For example, instead of a clip portion 140, the strap loop securing member 138 may instead be round and include a clasp that might allow the securing member 138 to fasten onto a belt loop in an embodiment where the releasably-engageable strap loop 100 is utilized to secure a strap onto fanny pack. In various embodiments, it is contemplated that the clip portion 138 is not limited to a clip, but can include any number or variation of fastening members.

Figure 6:
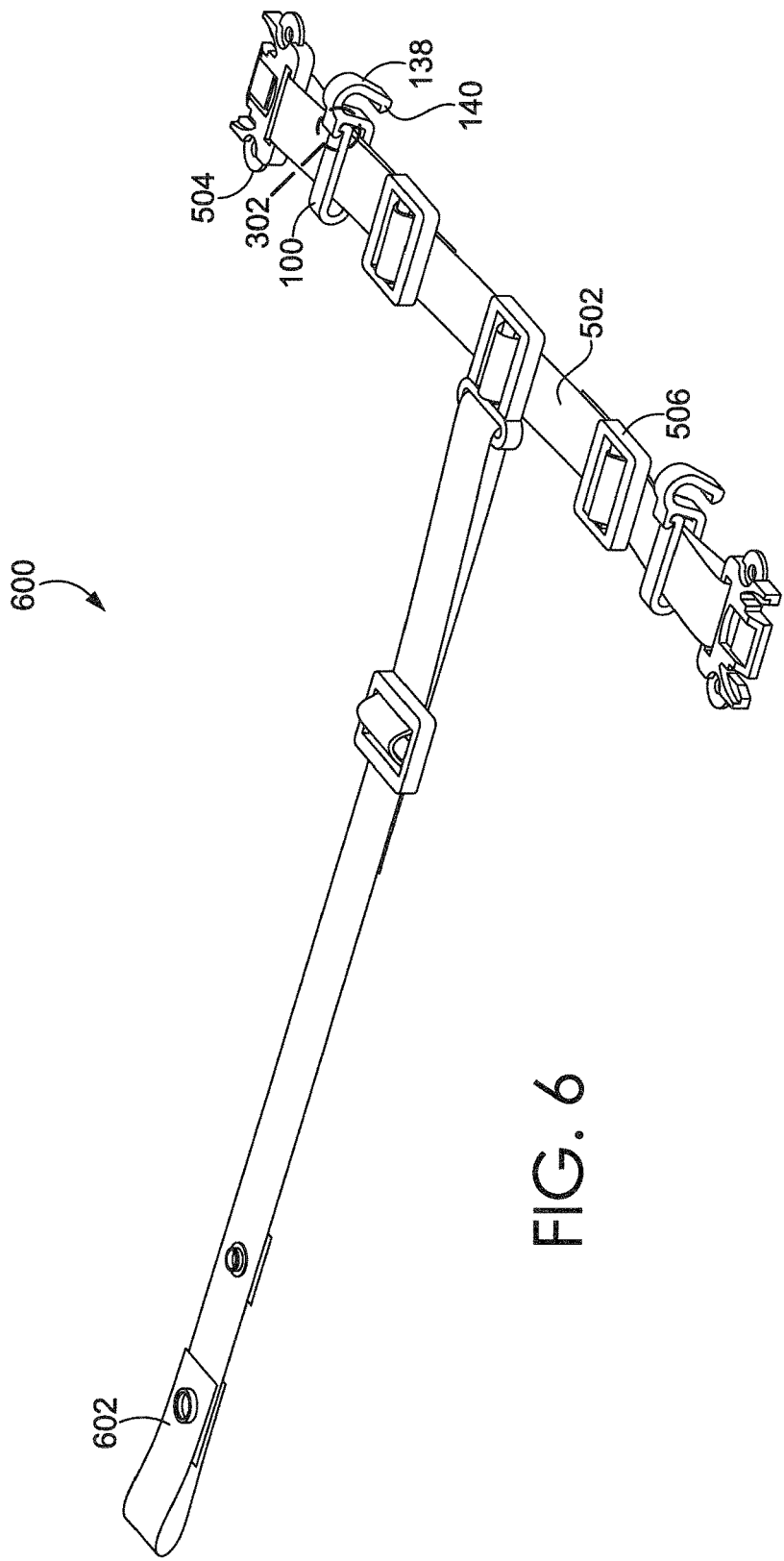
FIG. 6 depicts the tri-band strap where two releasably-engageable strap loops are in the engaged state and have received the first strap of the tri-band strap, in accordance with aspects herein.
Figure 7:
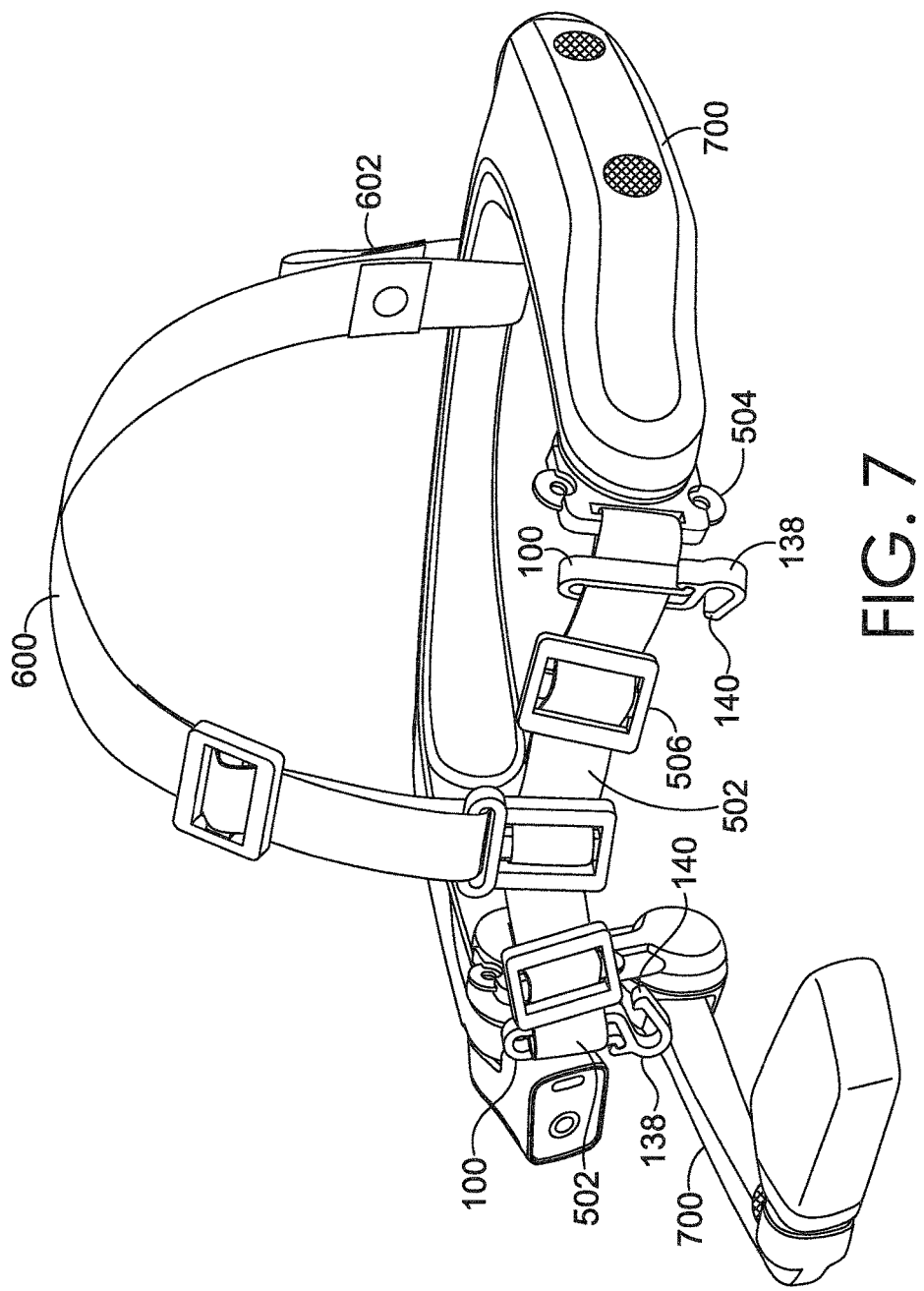
FIG. 7 depicts the head-mounted display unit with the first strap of the tri-band strap that has been received by the releasably-engaged strap loop, in accordance with aspects herein.

Next, FIG. 5 illustrates the releasably-engageable strap loop 100 in the engaged state 302 that receives a strap 502 of a tri-band strap 600 (show in FIG. 6). The continuously enclosed inner region 304 within which the strap 502 is resting is shown. In the present embodiment, the strap 502 has been received by the releasably-engageable strap loop 100. The releasably-engageable strap loop 100 is located between a front clip 504 and tri-glide buckle 506, which are also attached to the strap 502. The front clip 504 is configured to attach to the HMDU 700 as seen in FIG. 7. The tri-glide buckle 506 is configured to adjust the tri-band strap tightness once attached to the HMDU 700 and bump cap 802 (shown in FIG. 8). While FIG. 5 illustrates the releasably-engageable strap loop 100 between the front clip 504 and tri-glide buckle 506, it is contemplated that the releasably-engageable strap loop 100 may be located anywhere along the strap 502 of the tri-band strap 600.

FIG. 6 also depicts the strap loop 100 in the engaged state 302 where the strap loop 100 has received the strap 502 of the tri-band strap 600. In this configuration, two releasably-engageable strap loops 100 are positioned so that the strap loop securing member 138 comprising the clip portion 140 may be secured to each side of the cap brim 804 on a bump cap 802 (shown in FIG. 8.) The tri-band strap 600 further includes an adjustable portion 602 which will attach to the back of the HMDU 700 to further secure the tri-band strap 600, bump cap 802, and HMDU 700 together for use by the individual.

Next, FIG. 7 illustrates the HMDU 700 with the tri-band strap 600 that has been received by the releasably-engaged strap loop 100. In FIG. 7, the front clip 504 is secured into the HMDU 700 on both ends of the tri-band strap 600. Also, two releasably-engageable strap loops 100 can be seen on the tri-band strap 600 and the securing members 138 remain free and are not secured to an external body. Further, the releasably-engageable strap loop 100 may be moveable within the tri-band strap 600. As depicted, the releasably-engageable strap loop 100 is situated about halfway between the front clip 504 and the tri-glide buckle 506. However, the releasably-engageable strap loop 100 location may be adjusted as needed in order to provide optimal securement and restriction of movement, and in order to allow the securing member 138 to be in position to be secured to an external body.

Figure 8:
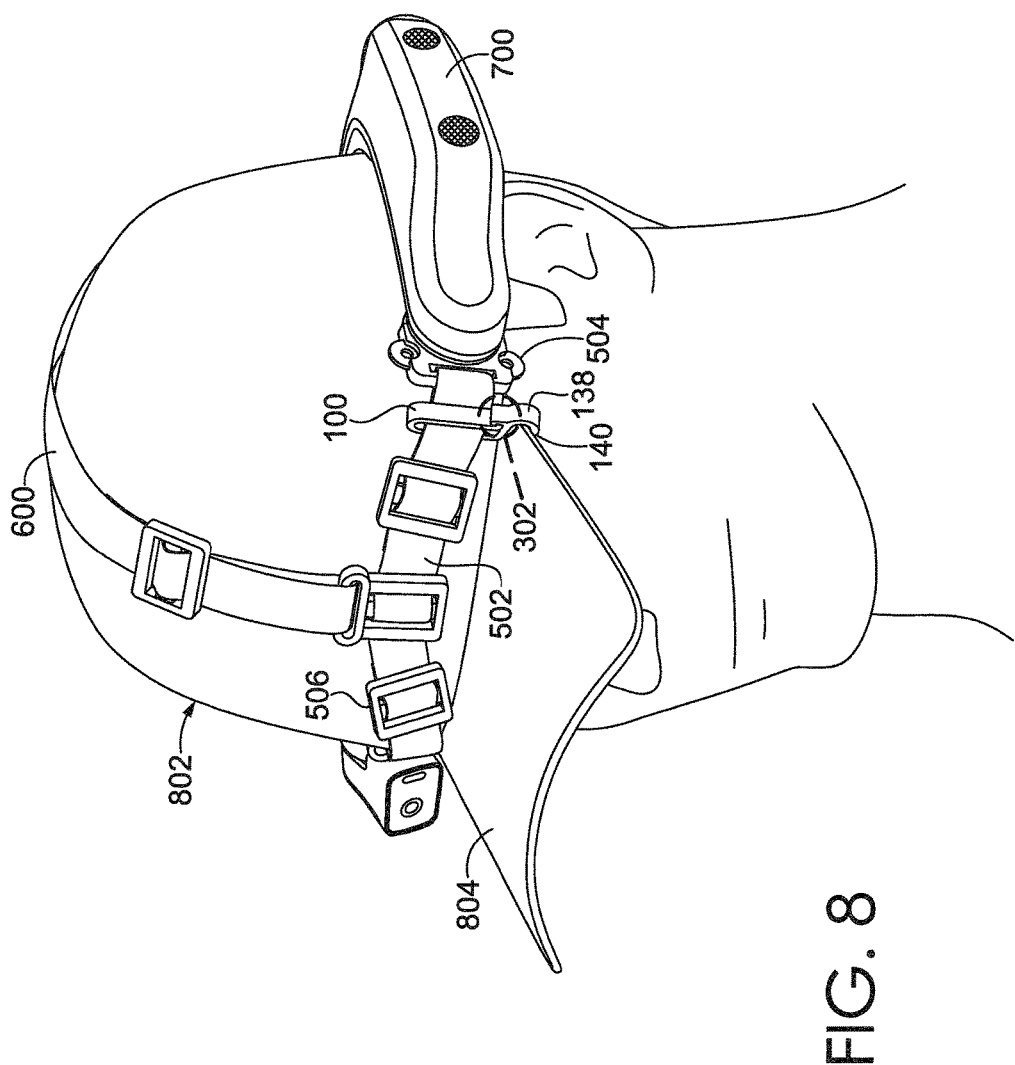
FIG. 8 depicts the head-mounted display unit on an individual where the securing member of the releasably-engageable strap loop is secured to the brim clip of a bump cap and the releasably-engageable strap loop is in the engaged state, in accordance with aspects herein.

Referring to FIG. 8, which depicts the tri-band strap 600 comprising the releasably-engageable strap loop 100 in the engaged state 302 where the tri-band strap 600 is secured to the HMDU 700 through the securement of the front clip 504. The clip portion 140 of the securing ember 138 is attached to the external body. In this embodiment, the external body that the securing member 138 is attached to is the cap brim 804 of the bump cap 802. As seen, the clip portion 140 secures into the side of the cap brim to provide additional securement of the tri-band strap 600. The securement of the releasably-engageable strap loop 100 and securing member 138 provide strong securement of the HMDU to the bump cap 802 and restrict movement. While not visible in FIG. 8, a second releasably-engageable strap loop 100 and securing member 138 are present on the opposite side of the bump cap 802. The second releasably-engageable strap loop 100 and securing member 138 are similarly secured to the strap 502 of the tri-band strap 600 and cap brim 804. It is contemplated that in other embodiments, the location and number of releasably-engageable strap loops 100 and securing members 138 may vary. Additionally, the location of where the securing member 138 secures itself to an external body may also vary.

Figure 9:
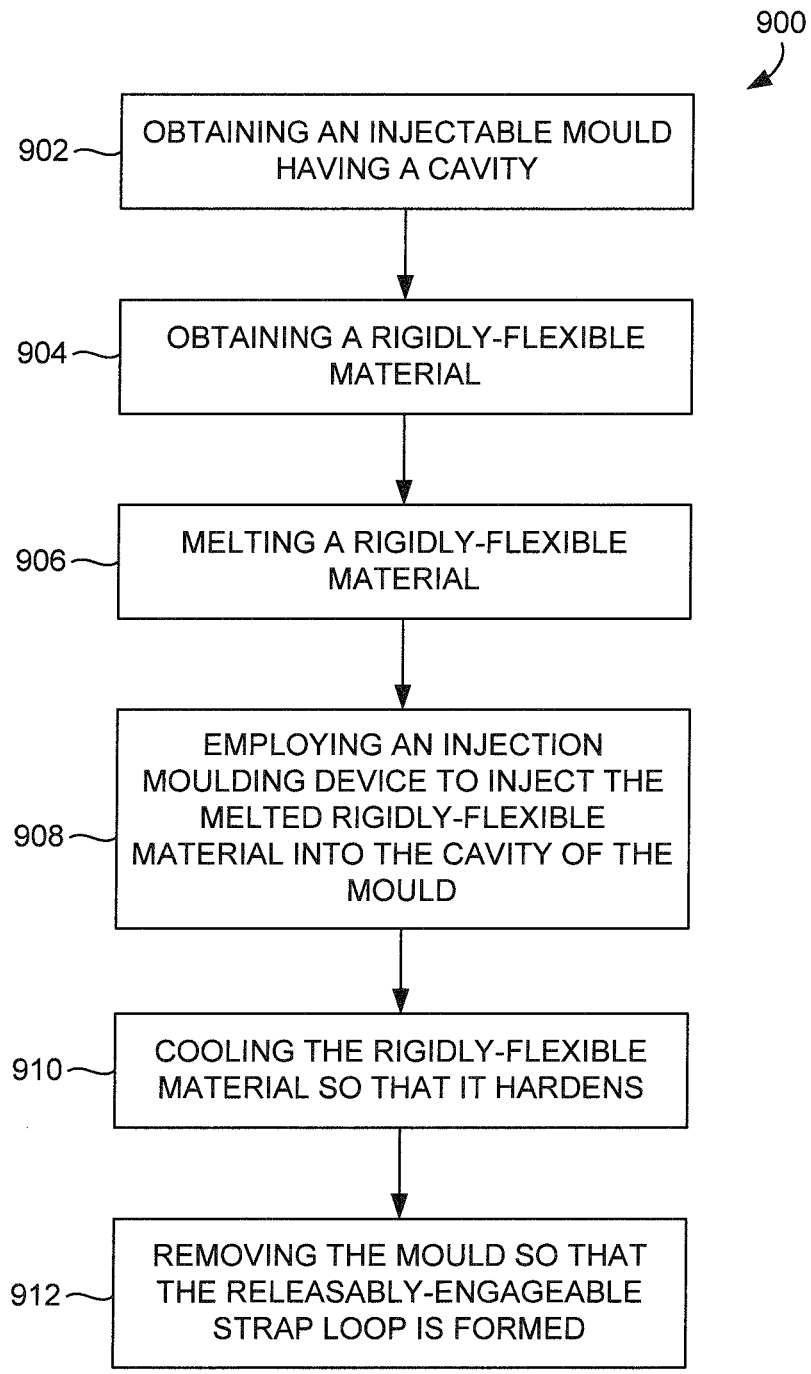
FIG. 9 depicts a flow diagram depicting an exemplary method for manufacturing an exemplary brim clip, in accordance with aspects herein.

Turning now to FIG. 9, a flow diagram of an exemplary method 900 of manufacturing a releasably-engageable strap loop 100 is provided in accordance with aspects herein. First, an injectable mould having a cavity that has a shape configured to the disclosed embodiments of the releasably-engageable strap loop is obtained at step 902. Next, at 904, a rigidly-flexible material (e.g., a plastic, polymer, or blend thereof) is obtained. The rigidly-flexible material can be heated to at least a melting point by the injection moulding device, or any other heating element at step 906 before it is fed into an injection moulding device. At step 908, the injection moulding device can then be employed to inject the melted rigidly-flexible material into the cavity of the injectable mould until the cavity is filled with the material. Once filled, the mould is set aside and the rigidly-flexible material is allowed to cool and harden at step 910. After the rigidly-flexible material is cooled and hardened, the mould can be removed so that that rigidly-flexible material is shaped in accordance with the described embodiments of the releasably-engageable strap loop at step 912. The releasably-engageable strap loop constructed in the foregoing manner can comprise a unitary body having a gate member and a hooked-frame member as described above. It is further contemplated that any other manufacturing process (e.g., 3D printing) for constructing the described releasably-engageable strap loop remain within the purview of the present disclosure.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

The phrase "in one embodiment" or "in an embodiment" is used repeatedly. The phrase generally does not refer to the same embodiment; however, it may. The terms "comprising," "having," and "including" are synonymous, unless the context dictates otherwise.

What is claimed is:

1. A releasably-engageable strap loop comprising:
    a unitary body having a gate member and a hooked-frame member, the gate member including a first elbow end joining a second elbow end of the hooked-frame member,
    wherein the gate member further includes a first engaging end opposite the first elbow end, the first engaging end having an outwardly-facing flange and at least one notched portion that together present a set of leg members and a corresponding set of outwardly-facing feet members,
    wherein the hooked-frame member further includes a second engaging end extending from a bended portion of the hooked-frame member opposite the second elbow end, the second engaging end having at least one inwardly-facing flange and the bended portion having at least one inwardly-facing saddle member,
        wherein the at least one inwardly-facing saddle member is configured to complement the set of leg members and the inwardly-facing flange is configured to complement the corresponding set of outwardly-facing feet members when the strap loop is in an engaged state.

2. The releasably-engageable strap loop of claim 1, wherein the unitary body comprises a rigidly-flexible material.

3. The releasably-engageable strap loop of claim 2, wherein the rigidly-flexible material includes a polymer.

4. The releasably-engageable strap loop of claim 1, wherein the releasably-engageable strap loop receives a first strap of a tri-band strap.

5. The releasably-engageable strap loop of claim 4, wherein the releasably-engageable strap loop is located between a front clip and a tri-glide buckle on the tri-band strap.

6. The releasably-engageable strap loop of claim 4, wherein at least one additional releasably-engageable strap loop receives the first strap of the tri-band strap.

7. The releasably-engageable strap loop of claim 1, wherein a continuously enclosed inner region is formed when the at least one inwardly-facing saddle member complements the set of leg members and the inwardly-facing flange complements the corresponding set of outwardly-facing feet members in the engaged state.

8. The releasably-engageable strap loop of claim 7, wherein the tri-band strap rests within the continuously enclosed inner region.

9. The releasably-engageable strap loop of claim 1, wherein the gate member has a first body portion and the hooked-frame member has a second body portion, the first body portion and the second body portion being configured to present an acute angle when the strap loop is in a disengaged state, and further being configured to be substantially parallel when the strap loop is in the engaged state.

10. The releasably-engageable strap loop of claim 1, the unitary body also having a strap loop securing member disposed opposite the inwardly-facing saddle member of the bended portion, the strap loop securing member being operable to secure the releasably-engageable strap loop to an external body.

11. The releasably-engageable strap loop of claim 10, wherein the strap loop securing member includes a clip portion.

12. The releasably-engageable strap loop of claim 11, wherein the clip portion is configured to secure the releasably-engageable strap loop to a cap brim on a bump cap.

13. The releasably-engageable strap loop of claim 12, wherein the releasable engagement of the clip portion of the securing member to the cap brim prevents the tri-band strap from moving while secured to the bump cap.

14. A releasably-engageable strap loop comprising:
    a securing member having a clip portion; and
    a unitary body having a gate member and a hooked-frame member, the gate member including a first elbow end joining a second elbow end of the hooked-frame member,
    wherein the gate member further includes a first engaging end opposite the first elbow end, the first engaging end having an outwardly-facing flange and at least one notched portion that together present a set of leg members and a corresponding set of outwardly-facing feet members,
    wherein the hooked-frame member further includes a second engaging end extending from a bended portion of the hooked-frame member opposite the second elbow end, the second engaging end having at least one inwardly-facing flange and the bended portion having at least one inwardly-facing saddle member,
        wherein the at least one inwardly-facing saddle member is configured to be releasably coupled to the set of leg members and the inwardly-facing flange is configured to be releasably coupled to the corresponding set of outwardly-facing feet members when the strap loop is in an engaged state.

15. The releasably-engageable strap loop of claim 14, wherein the clip portion of the strap loop securing member is configured to secure the releasably-engageable strap loop to an external body.

16. The releasably-engageable strap loop of claim 14, wherein pressure is applied to a first body portion of the gate member to releasably couple the inwardly-facing saddle member to the set of leg members and the inwardly-facing flange to the outwardly-facing feet members to form the engaged state.

17. The releasably-engageable strap loop of claim 14, wherein the gate member has a first body portion and the hooked-frame member has a second body portion, the first body portion of the gate member being pivoted in a direction opposite the second portion of the hooked-frame member when the strap loop is in a disengaged state.

18. The releasably-engageable strap loop of claim 17, wherein the disengaged state results in an open inner region.

19. A method of manufacturing a releasably-engageable strap loop, the method comprising:
  obtaining a mould having a cavity;
  melting a rigidly-flexible material; and
  employing an injection moulding device to inject the melted rigidly-flexible material into the cavity of the mould so that a releasably-engageable strap loop is formed in accordance with a shape presented by the cavity,
  wherein the releasably-engageable strap loop includes a unitary body having a gate member and a hooked-frame member, the gate member including a first elbow end joining a second elbow end of the hooked-frame member,
  wherein the gate member further includes a first engaging end opposite the first elbow end, the first engaging end having an outwardly-facing flange and at least one notched portion that together present a set of leg members and a corresponding set of outwardly-facing feet members,
  wherein the hooked-frame member further includes a second engaging end extending from a bended portion of the hooked-frame member opposite the second elbow end, the second engaging end having at least one inwardly-facing flange and the bended portion having at least one inwardly-facing saddle member,
  wherein the at least one inwardly-facing saddle member is configured to be releasably coupled to the set of leg members and the inwardly-facing flange is configured to be releasably coupled to the corresponding set of outwardly-facing feet members when the strap loop is in an engaged state.

20. The method of claim 19, wherein the rigidly-flexible material includes at least one of a polymer, polyethylene, and polypropylene.

\* \* \* \* \*